United States Patent

Lambeek et al.

[15] 3,653,607

[45] Apr. 4, 1972

[54] MEANS FOR CAUSING REVERSAL OR SWITCHING-OFF MOVEMENT OF A RECORD CARRIER IN A RECORDING AND/OR PLAYBACK APPARATUS

[72] Inventors: Adriaan Jan Jurriaan Lambeek; Friedrich Laa; Karl Rupp, all of Vienna, Austria

[73] Assignee: U.S. Philips Corporation, New York, N.Y.

[22] Filed: Mar. 10, 1969

[21] Appl. No.: 805,515

[30] Foreign Application Priority Data

Mar. 11, 1968 Austria .............................. A 2369/68
June 18, 1968 Austria .............................. A 5834/68

[52] U.S. Cl. .............................................................. 242/191
[51] Int. Cl. .................................... G11b 15/46, B65h 25/32
[58] Field of Search .................. 242/186, 187, 188, 189, 190, 242/191, 57; 200/61.17

[56] References Cited

UNITED STATES PATENTS

| | | | |
|---|---|---|---|
| 2,514,402 | 7/1950 | Lyon | 200/61.17 X |
| 3,488,017 | 1/1970 | Schattenman | 242/191 |
| 3,511,451 | 5/1970 | Emmert | 242/201 |

*Primary Examiner*—George F. Mautz
*Attorney*—Frank R. Trifari and Arthur Dresner

[57] ABSTRACT

Control mechanism for a tape recording and/or playback apparatus which senses when the winding disc has stopped and will switch off or reverse the movement of the tape. A cam operated member has one end which periodically contacts a control switch, the other end has a feeler in contact with the winding disc such that when the winding disc has stopped the cam operated member will be held in one switching position and will thereby initiate the switching off or reversing operation.

13 Claims, 18 Drawing Figures

INVENTORS.
ADRIAAN J.J.LAMBEEK
FRIEDRICH LAA
KARL RUPP
BY
AGENT

INVENTORS.
ADRIAAN J.J.LAMBEEK
FRIEDRICH LAA
KARL RUPP
BY
AGENT

INVENTORS.
ADRIAAN J.J.LAMBEEK
FRIEDRICH LAA
KARL RUPP
BY
[signature]
AGENT

INVENTORS
ADRIAAN J. J. LAMBEEK
FRIEDRICH LAA
BY KARL RUPP
AGENT

INVENTORS.
ADRIAAN J.J.LAMBEEK
FRIEDRICH LAA
KARL RUPP
BY
AGENT

INVENTORS.
ADRIAAN J. J. LAMBEEK
FRIEDRICH LAA
KARL RUPP
BY [signature]
AGENT

MEANS FOR CAUSING REVERSAL OR SWITCHING-OFF MOVEMENT OF A RECORD CARRIER IN A RECORDING AND/OR PLAYBACK APPARATUS

The invention relates to a recording and/or playback apparatus having means for switching off or reversing the direction of movement of the drive of a record carrier. The switching or reversing means comprises a switch actuated periodically by means of a cam element. The recording and/or playback apparatus comprises at least a first component, which in operative condition of the apparatus rotates constantly, and a second component which rotates only during movement of the record carrier.

Apparatus comprising such means may be automatically switched off, when the record carrier, hereinafter termed tape, reached its end, so that damage to the apparatus or to the tape could be avoided. The operative condition of the apparatus may also be changed over to another condition in which opposite direction of movement of the tape is obtained so that no interruption, for example, of playback performance, will occur. In order to obtain a means to initiate the switching-off or changing-over operations a switch which is periodically closed and opened during continuous travel of the tape is provided. This switch controls an electric device for actuating a switching-off or changing-over relay. When the tape is not moving the switch may either by in fully open state or in the fully closed state so that the switch will not be periodically opening and closing. By means of the switch, for example, the charge of a capacitor is determined, which capacitor actuates the relay. Such an arrangement is relatively complex, since the relay will respond regardless of the open or closed position of the switch, however, it should not respond when the switch is periodically opened and closed. Opening and closing of the switch is performed by a cam means, which is connected with the second component of the apparatus, for example, a winding device, rotating only during the travel of the tape.

The object of the invention is to provide a particularly simple and reliable device of the kind set forth and is characterized in that the cam means is associated with the first component of the apparatus and is adapted to cooperate with an operating member adapted to be actuated by said cam means so as to actuate the switch. The operating member is provided with at least one feeler means which is adapted to cooperate with the second component of the apparatus and is arranged so as to be carried along by frictional contact against the bias of a spring in the direction of rotation thereof. When the second component is prevented from rotating and after displacement of the operating member by means of the cam means, the operating member will be in a position to hold the switch in a stable condition, i.e., either in the open or in the closed condition, without oscillating.

Thus, with a constantly moving tape, and therefore during constant rotation of the second component, the operating member periodically actuates the switch to the on and off position, whereas upon a standstill of the tape, and therefore non-rotation of the second component, the switch will be maintained in only one switching condition. In this way the electric circuitry for actuating the switching off or changing over circuits can be kept simple and may simply be a delayed-action relay controlled by the switch.

A very simple arrangement results by mounting the cam means on a fly-wheel body of the apparatus, thus forming the first component of same. A space-saving device, particularly suitable for use in small apparatus is obtained by an embodiment having a winding device for the record carrier which has a driven member. The member may be driven by means of a friction clutch by a driving member. The embodiment is further characterized in that the driving member forms the said first component of the apparatus with which the cam means is associated.

The second component of the apparatus with which the feeler means cooperates may be formed by a disc which is connected with a roller moved by the tape. It is desirable, however, that the winding mandril part of the record carrier device be used as a second component of the apparatus. It is also desirable for the winding device to be the take-up means for the record carrier at normal forward travel. Using the take-up device for initiating the switching-on or changing-over operations is particularly important in tape player apparatus using a tape magazine without spools. Irregular winding of the tape in such apparatus may cause jamming of the tape in the magazine on the take-up side. The tape will therefore not be wound on the take-up means, but tape will continue to be supplied by means of a capstan, so that loops will be formed and the tape may be damaged. However, this is avoided by the foregoing device since the apparatus will be automatically switched off when the takeup device is not rotating.

A simple embodiment is characterized in that the feeler means is formed by an extension of the operating member and that the frictional contact with the second component of the apparatus is interrupted in an extreme position of the cam means.

Particularly with respect to reliability it has been found to be of great advantage to use an embodiment which is characterized in that the feeler means is formed by an arm adapted to be turned against the bias of the spring away from a stop on the operating member so as to form a holding device for the operating member. The arm will automatically brake the second component of the apparatus when at a standstill position and of the operating member when in an extreme position attained by means of the cam means, thus holding the operating member. By these steps the operating member is held in the position in which it disengages the switching-off or changing-over operations, and is no longer moved by the cam means so that a reliable actuation of the switch is ensured. It has further been found to be advantageous if the free end of the arm is maintained in contact with the second component of the apparatus under the bias of the spring in all positions of the operating member. In this manner, the rotary movement of the second component is not affected, which is very important in order to reduce wow and flutter of the apparatus.

A further desirable arrangement is to provide that the frictional contact between the feeler means and the second component be interrupted by a pivotal movement of the feeler away from the component when it reverses direction. Thus at a reversal of the direction of movement, the feeler means will in no way affect the second component of the apparatus.

It is further advantageous, to provide the operating member with two feeler means having opposite directions of movement. One of them will be released by means of a changing-over device in accordance with the direction of rotation of the second component of the apparatus for cooperation with this component. The other is kept out of engagement. In an apparatus having two winding devices it is advantageous to provide the operating member with two feeler means, each one being associated with a winding device. In accordance with the actual direction of movement of the record carrier at each such direction of movement only one of the two feeler means will cooperate with its associated winding device. These steps ensure that the switching-off or changing-over device can always be made operative independent of the direction of movement of the tape.

In the manner described hereinbefore the switch is periodically opened and closed by the operating member controlled by the cam means, when the second component of the apparatus is rotating, whereas at a standstill of said component it occupies a defined switching position. In order to have a possibility of a constant switching function from this switch also during the rotation of the second component of the apparatus, a delay element is required. This should maintain the switching function even when the switch transiently leaves one of the switching positions during the periodic opening and closing. Such a delay element may, as stated above, be formed by a delayed-action relay or by a storing circuit including a capacitor.

Such a delay element may be dispensed with, when according to a further embodiment of the invention two operating members controlled in opposite senses by the cam means are provided. Each cam means has a feeler means co-operating with the same second component of the apparatus, the actuation of the switch by the operating members being performed in relative overlap. Thus the electric switching arrangement for switching off or reversing the drive of the tape becomes quite simple.

It is also desirable to have the two operating members controlled in opposite senses by the same cam means. A further simplification is obtained by associating the two operating members with one commonly actuated switch.

In an apparatus comprising a device for switching off the drive of the record carrier it has been found desirable that the operational voltage of the apparatus be directly controlled by the switches. Other electric elements of the apparatus are therefore simultaneously switched off, so that, for example, in a battery-driven apparatus no unnecessary current is consumed.

The invention will now be described more fully with reference to the accompanying drawing, which shows a number of embodiments thereof, in which.

Figure 9:
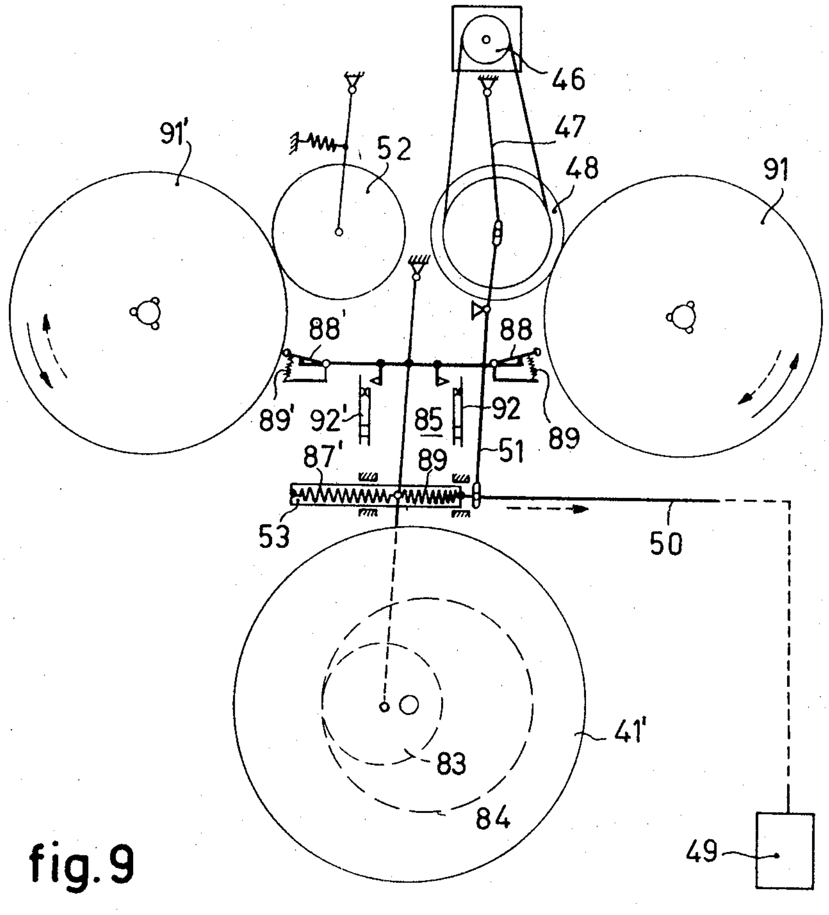
Figures 13, 14, 15:
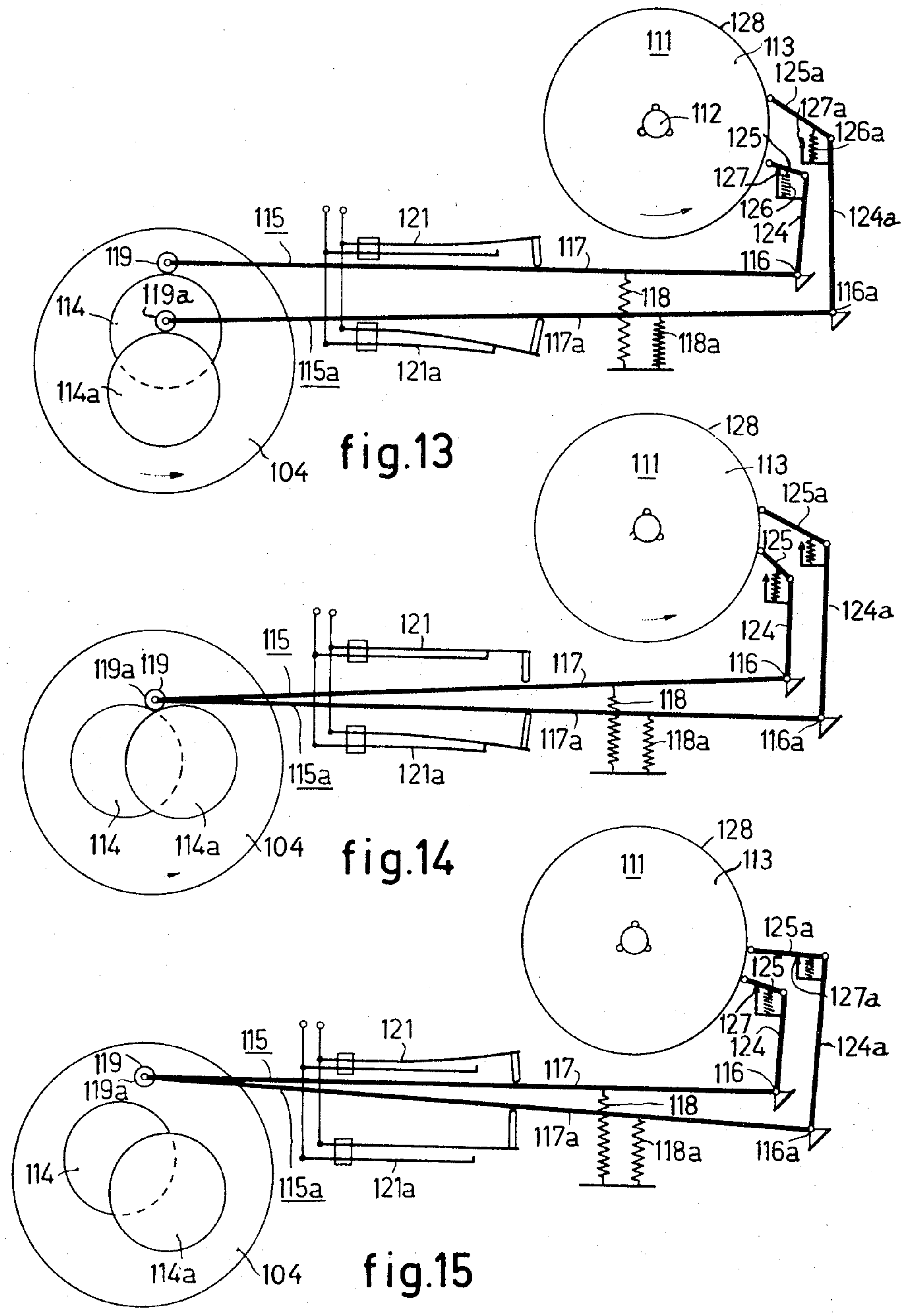
Figure 10:
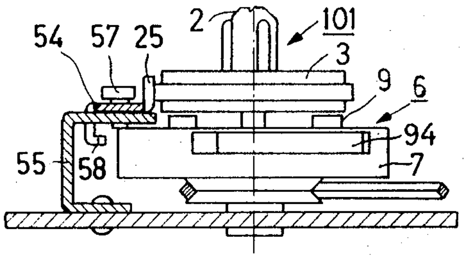
Figure 11:
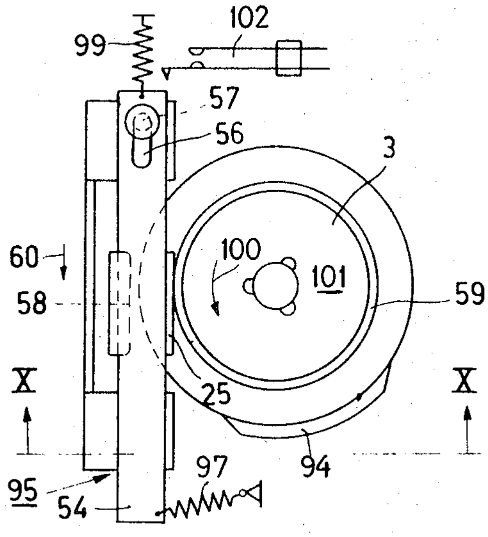
Figure 12:
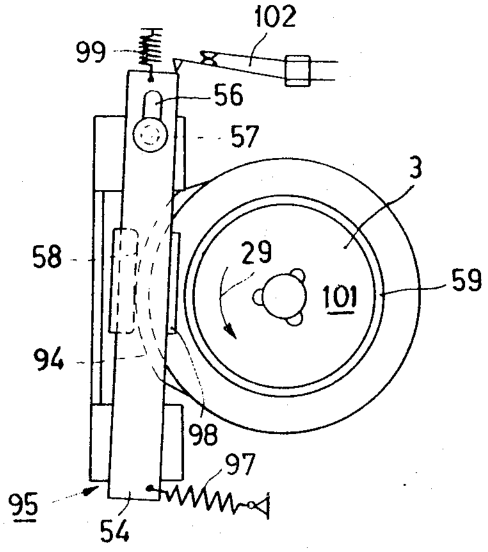
Figure 16:
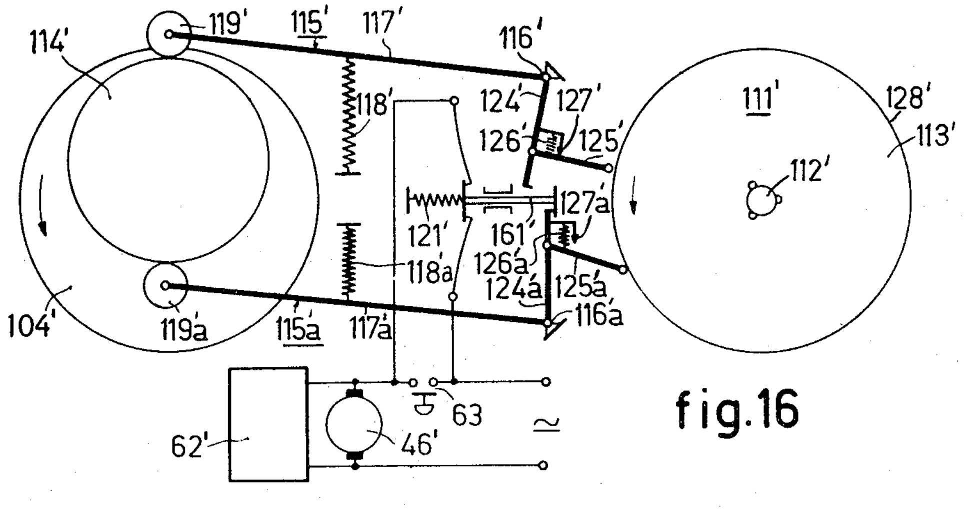
Figure 17:
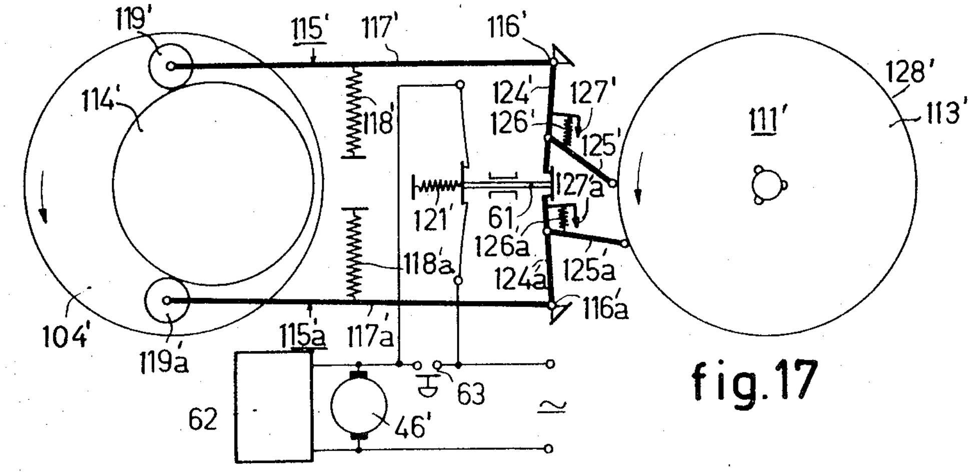
Figure 18:
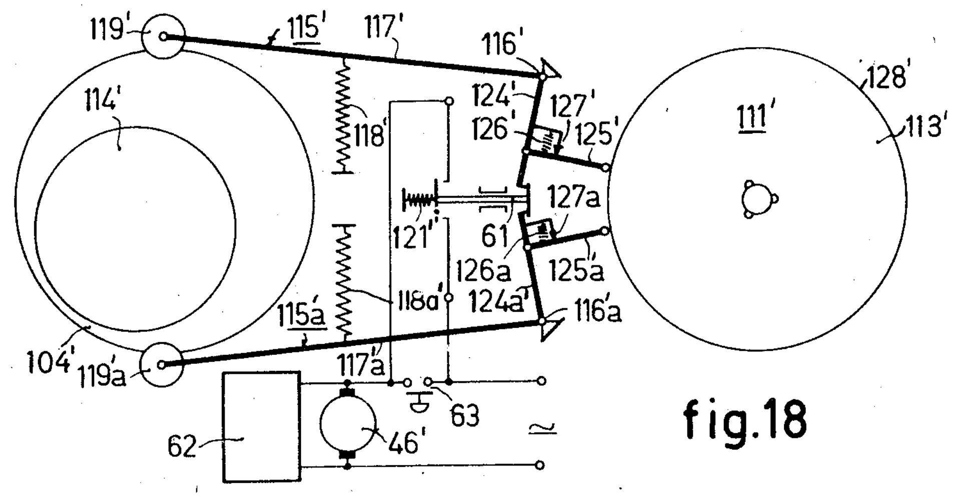

FIG. 9 diagrammatically shows a further embodiment of the present invention with two feeler means each cooperating with a different winding device;

FIG. 10 is a side elevational view, in partial section, of an embodiment having feeler means formed as an extension of an operating member;

FIG. 11 is a plan view of the embodiment shown in FIG. 10;

FIG. 12 is a plan view showing the embodiment of FIG. 10 in a different operational position;

FIGS. 13 to 15 are plan views showing a further embodiment in different stages of operation, in which two operating members are controlled by one cam means; and FIGS. 16 to 18 are plan views showing another embodiment in different stages of operation, in which two operating members are controlled by a single cam means and actuate a common switch.

In the following discussion of the various embodiments of the present invention, for the sake of clarity a detailed description of those elements and parts of the apparatus not essential for the invention and not required for a complete understanding of the invention and its operation, has been omitted.

Figure 1:
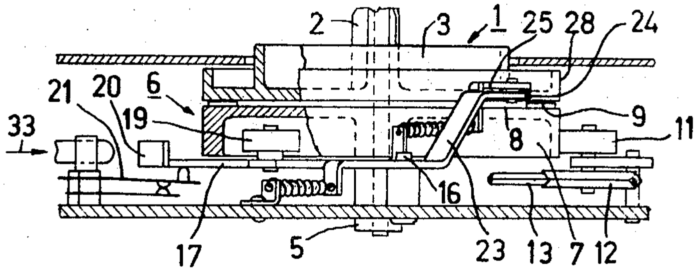
FIG. 1 is a side elevational view, in partial section, of a first embodiment of the present invention, in which a cam means is associated with a driving part of a frictional clutch for a winding device.
Figure 2:
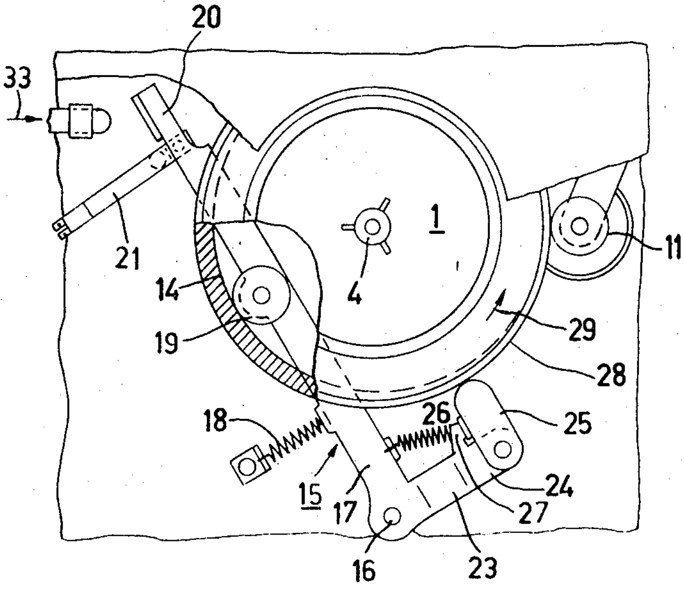
FIG. 2 is a plan view, in partial section, of the embodiment shown in FIG. 1.
Figure 3:
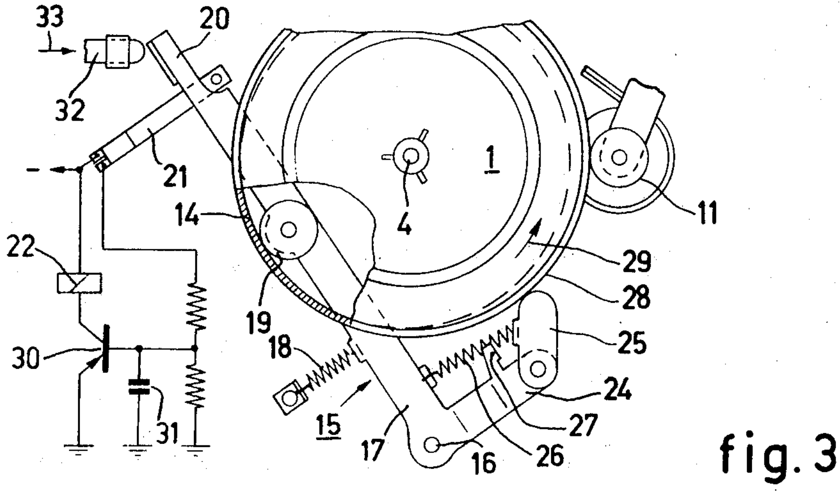
FIG. 3 is a partially sectioned plan view of the same embodiment shown in a different operational position.

Referring to FIgS. 1 to 3, reference numeral 1 designates a winding device of a recording and/or playback apparatus. The device comprises a winding mandril 2 and a winding disc 3 adapted to receive, in a conventional manner, a tape arranged, for example, on a spool. The winding device further comprises a central shaft 4 rotatably journaled in a bush 5 so as to be axially displaceable within given limits. The winding device 1 is driven by a friction clutch 6, formed by a disc 7 rotatably mounted on the shaft 4 and bearing on the bush 5. The disc 7 is provided on its top face 8 with a frictional coating 9. The winding device 1 bears against the frictionally coated surface 8 under the action of its own weight. The friction clutch 6 is driven by a wheel 11, which can be pressed against the rim 10 of the disc 7. The wheel 11 is linked to the motor of the apparatus, for example, by an intermediate pulley wheel 12 and belt 13. In this type of apparatus, the winding device 1 operates as the take-up means for the tape during its normal forward travel so that the device is driven both during the recording operation and in the playback operation and, if required, also during a high-speed forward movement of the tape. The disc 7 of the friction clutch 6 constitutes a first component of the apparatus which is constantly driven. The winding disc 3 constitutes a second component which does not constantly rotate under all conditions. For example, if the tape on the winding disc is withheld for some reason or other, the winding disc 3 will not rotate in spite of the rotation of the disc 7. During normal travel of the tape however the disc 3 will be rotating.

The disc 7 is bell shaped and is provided on its inner side with an eccentric track forming a cam means 14. An operating member 15, formed by a lever 17, is adapted to pivot about the shaft 16 for cooperation with the cam means. A roller 19 carried on the chamber 15, is arranged to bear on the track of the cam means 14 under the action of a spring 18. One free end 20 of the lever 17 cooperates with a switch 21, which controls the arrangement shown in detail in FIG. 3, for actuating a relay 22 controlling the switching-off or the change-over of a tape drive. The actual device for switching off or changing over the tape drive is not shown or described herein, as it forms no part of the present invention. One simple arrangement however, may be such that the relay 22 switches off the supply voltage of the driving motor or provides a mechanical uncoupling of the drive through a lifting magnet.

The other free end 24 of the lever 17, extending by a bend 23 towards the winding device 1, is provided with an arm-shaped pivotally mounted feeler 25. This feeler is urged against a stop 27 of the lever 17 by the action of a spring 26. The free end of the feeler 25 is shaped in a form such that it can cooperate with said second component of the apparatus, specifically with the rim 28 of the winding device 1.

When the cam means 14 is in the position shown in FIGS. 1 and 2, the operating member 15 occupies an extreme position, in which the roller 19 is at the minimum distance from the shaft 4. The end 24 of the operating member is then at the maximum distance from the periphery 28 of the winding device. In this position shown in FIGS. 1 and 2, the feeler 25 is in contact with the stop 27, and its free end extends in a radial direction towards the winding device without being in direct contact with the periphery 28 thereof. In this position the operating member 15 holds the switch 21 in the closed state.

When the winding device is moved out of the position shown in FIGS. 1 and 2, in the direction of the arrow 29, by means of the disc 7, the end 24 of the operating member is displaced by the cam means 14 towards the rim 28 of the winding device so that the free end of the feeler 25 comes into contact with the rim and is carried along by frictional contact against the action of the spring 26. FIG. 3 shows the position of the device in which the cam means has caused the operating member 15 to be located the maximum distance away from the shaft 4, so that the switch 21 is opened by said member. The feeler 25 will slip along the periphery 28 of the winding device when the member 15 is in this position.

Upon further rotation of the winding device in the direction of the arrow 29, the position shown in FIGS. 1 and 2 will be restored. This means that with constant rotation both of the first component and of the second component of the apparatus, i.e., disc 7 and of the winding disc 3 respectively, the operating member 15 is constantly reciprocated, so that by means of said member the switch 21 is periodically opened and closed. During this periodic actuation of the switch, the relay 22 will not operate because the capacitor 31 in the base circuit of the transistor 30, controlling the relay, will not acquire a charge sufficient for the transistor to draw a sufficiently high current. In this way the switching-off and changing-over of the drive of the tape does not become operative.

If however, for some reason or other to be explained hereinafter, the winding device is arrested, the disc 7 provisionally continues rotating in the direction of the arrow 29. During this rotation of the disc 7 the cam means 14 will reach the position shown in FIGS. 1 and 2, in which the operating member is moved to a distance such that the feeler 25 extends in a radial direction to the winding device. If the disc 7 continues rotating, the free end of the arm 25 automatically engages the periphery 28 of the winding device. Since the winding device is arrested, however, the feeler will not be carried along its periphery. Thus the operating member 15 is held in this position and can no longer follow the track of the cam means. The feeler 25 thus acts as a holding member for the operating member. In this position, in which the operating member is held, the switch 21 is closed. The switch 21 will thus be closed for a fairly long time so that the capacitor 31 can acquire such a charge that the transistor 30 will pass a current causing the relay 22 to respond, so that the switching-off or changing-over of the tape drive is released.

The standstill or arresting of the winding device may be due to a variety of causes. In the present case of a take-up device the apparatus employs magazines in which the end of the tape is tightly fixed to a spool core, so that the spool is arrested when the end of the tape is reached and the winding device will stand still. In magazines in which the tape winding is arranged in the magazine without being protected by spool flanges, it is particularly important to use the take-up device as the second component of the apparatus. When the tape is jammed in the magazine, the tape spool is arrested. The tape transport capstan, however, continues supplying tape so that loops of tape will be formed and damage to the tape is likely to occur. This is avoided by the above described arrangement, since upon a standstill of the take-up device the switching-off device becomes operative. If tape which is loosely connected with a spool is used it is desirable to use the supply disc as the second component of the apparatus, since that disc will not rotate at the end of the tape or in the event of rupture of the tape. In practice, both the supply disc and the take-up disc may be provided with such a device so that in both directions of movement of the tape the device can be operative.

It will be obvious from the foregoing that the device is operative only in the direction of rotation in which the feeler can be turned away from the stop (such as stop 27). Therefore, in the case of winding devices driven in both directions provision should be made so that the feeler does not interfere with the winding device in the direction of rotation in which the device is not operative. This may be achieved by causing the feeler to cooperate with the winding device by an automatic friction contact only in one direction of rotation, while it is caused to slide along in the other direction of rotation. This may be achieved by a roller, arranged at the free end thereof and adapted to cooperate with the winding device and to rotate only in one direction. However, as an alternative the whole operating member may be moved so that the feeler no longer cooperates with the winding device. As is shown in FIGS. 1 to 3, a slide 32 is provided for this purpose. Slide 32 co-operates with the end of the level 17, which swings it upon displacement in the direction of the arrow 33 to an extent such that the end 20 releases the switch 21 so that the device is put out of operation, since the switch 21 is opened and the feeler 25 is moved away from the rim 28. Displacement of the slide 32 may be caused by the mechanism for the manual reversal of the direction of movement of the tape or automatically at the reversal of the direction of rotation.

Figures 4, 5, 6:
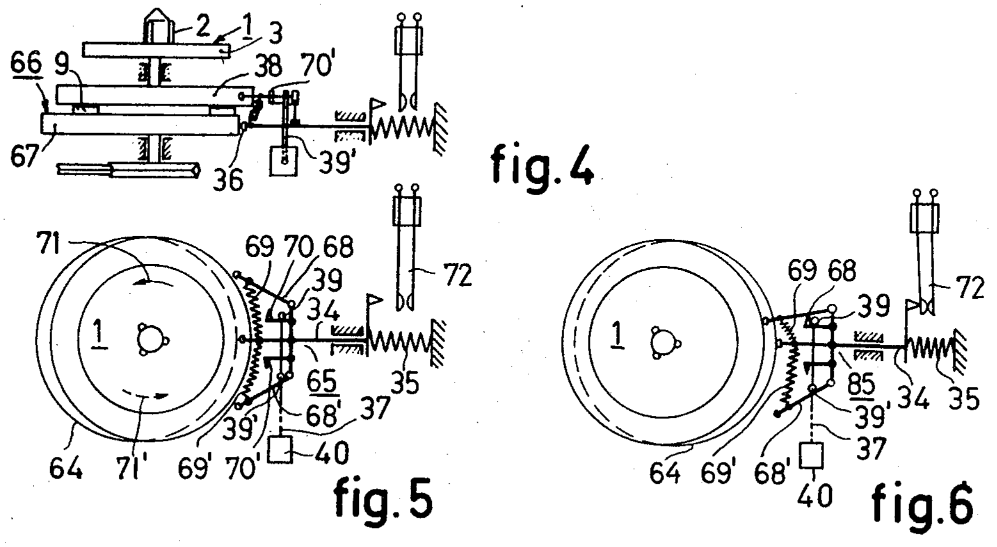
FIGS. 4 and 5 are schematic views of a further embodiment incorporating two feeler means.
FIG. 6 is a schematic plan view showing a further operational position of the embodiment shown in FIGS. 4 and 5.

In the embodiment shown in FIGS. 4 to 6 and operating member 65 (functioning in a similar manner as member 15 of FIGS. 1–3) is formed by a longitudinally displaceable slide 34. The free end 36 of member 65 under the action of a spring 35 cooperates with the track of a cam means 64 on driving part 67 of the friction clutch 66 for the winding device 1. This operating member is provided with two feelers 68 and 68', which are urged by springs 69 and 69' away from stops 70 and 70' of the switching member. The feeler 68 is associated one the one direction of rotation 71 of the winding device, and the feeler 68' with the opposite direction of rotation 71. A change-over device 37 ensures that only the feeler which is associated with the actual direction of rotation co-operates with the second component of the apparatus, i.e., the rim of a disc 38 associated with the winding device, the other feeler is being held out of engagement. For this purpose a longitudinally displaceable bar is used, a stop 39 or 39' of which extends between an arm and a stop of a feeler. This bar is controlled by a control-member 40, by which the direction of movement of the tape can be changed over. In this way the arresting or standstill of the same winding device, from either direction of rotation, provides the criteria fro initiating the device for switching off or changing over the tape drive. The winding device may be operative in one direction of rotation as a take-up disc and in the other direction as a supply disc, which implies that the end of the tape should be tightly fixed to both spool cores in order to ensure that rotation of the winding disc is arrested at the end of the tape travel in either direction. FIG. 5 shows the position in which the feeler 68 is shifted by means of the operating member 65, actuated by the cam means 64, to its minimum distance from the winding device. FIG. 6 shows the position in which the feeler 68, in contact with the stop 70, extends just up to the rim of the winding device. At a standstill of the winding device the the operating member is held in accordance with the position of FIG. 6 by the feeler 68 bearing on the winding device so that the switch 72 (functioning similar to switch 21 of FIGS. 1–3) is held in the closed state. However, when the winding device is rotating, the feeler 68 is carried along by the frictional contact so that by means of the cam means the operating member performs a reciprocatory movement, the switch being thus periodically opened and closed.

Figure 7:
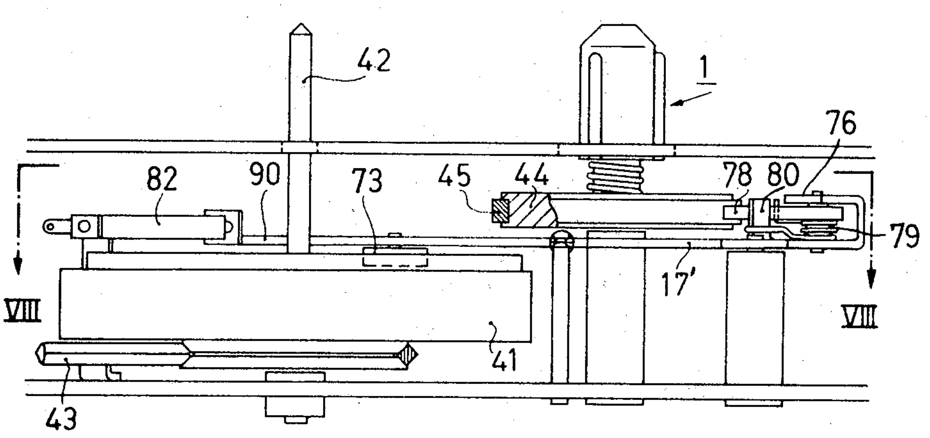
FIG. 7 is a side elevational view of an embodiment employing cam means associated with a fly-wheel arrangement.
Figure 8:
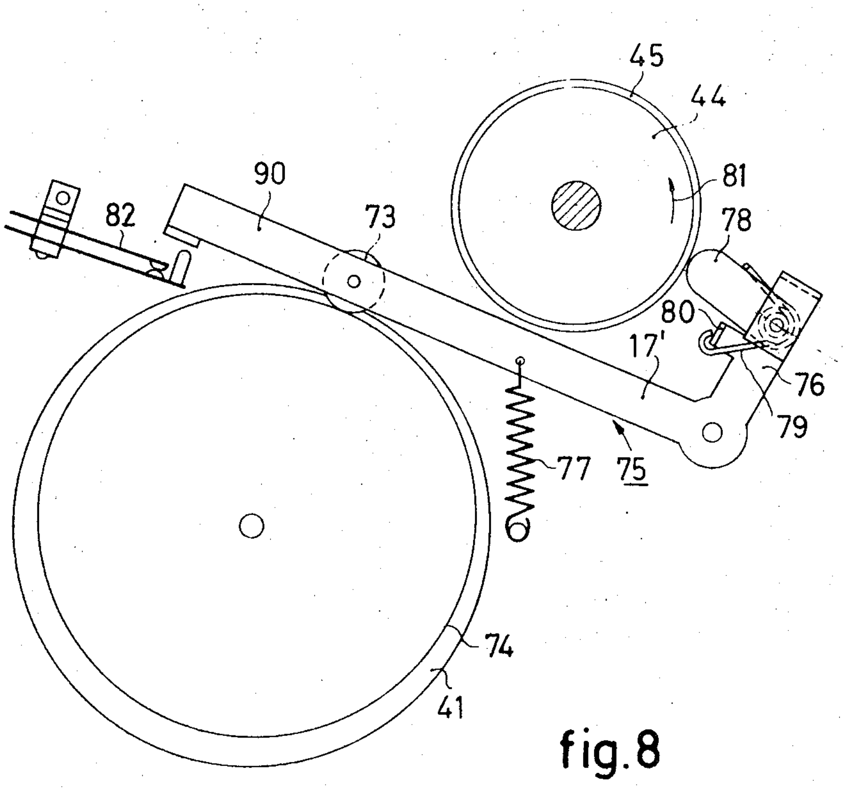
FIG. 8 is a sectional view taken along the lines VIII—VIII of FIG. 7.

In the device shown in FIgS. 7 and 8 the first component of the apparatus constantly rotating when in operation and provided with the cam means 74 is formed by a fly-wheel body 41 of the apparatus. This is usually coupled with a capstan 42, which drives the tape together with a pressure roller (not shown). The fly-wheel body is driven, for example, by a belt 43 of a motor of the apparatus. The operating member 75 is similar to that of the embodiment of FIGS. 1 to 3 referred to therein as numeral 15. The feeler 78 cooperates again with a disc 44, which is linked to the winding device 1, for example, a freely rotating, non-driven supply device. The feeler is subjected to the action of a helical spring 79, which tends to urge it against the stop 80. The direction of rotation of the winding device in which the device is operative is that of the arrow 81.

FIG. 8 shows the position of the operating member in which it is displaced by the cam means to an extent such that the end 76 supporting the feeler is at its maximum distance from the winding device. The arm-shaped feeler 78 has a length such that in this position of the operating member also, its free end is in contact with the disc 44. A rubber coating 45 is provided at the periphery of disc 44 for increasing the friction. The angle between the center line of the arm 78 and the line of connection between the shaft of the winding device and the pivotal axis of the arm is chosen to be very small, for example, about 5°, so that at a standstill of the winding device the arm is automatically braked at the rubber coating 45 and holds the operating member in position. In this way the feeler is constantly in contact with the winding device and is never completely lifted so that the winding disc will not experience a shock when it starts carrying the feeler. This is very important in order to reduce wow and flutter of the apparatus. The operation is otherwise similar to that of the embodiments described above.

FIG. 9 shows the embodiment of an apparatus in which one of two winding devices 91, 91' (similar to winding device 1 of the previous embodiments) can be driven in the forward or backward direction. For this purpose a motor-driven intermediate wheel 48 is arranged on a pivotal arm 47 and is adapted to be brought into contact with either the winding disc 82 or with the intermediate wheel 52 co-operating with the winding disc 82. Arm 47 is actuated by a control-member 49 which acts on the levers 50 and 51 respectively.

The operating member 85 of this embodiment has two feelers 88, 88' of the kind described above, each feeler being associated with a winding device. The pivotal direction of the feelers away from the stop corresponds with the direction of rotation of the winding device concerned during the supply operation. The cam means 84 is formed by a recess in the fly-wheel body 41', which accommodates the roller 83, associated with the operating member and co-operating with the track of the cam means 84.

In order to cause each feeler to co-operate with a winding device, the operating member 85 is adapted to pivot. By means of the lever 50 a beam 53 is displeceable in the direction of its length and transverse to the operating member, the two ends of said beam being provided with a spring 87 and 87' respectively. The free ends of the two springs are connected with the operating member 85. In accordance with the position of the beam relative to the operating member, only one of the two springs is biassed and urges the roller 83 against the cam means, so that it follows the movement thereof. In changeover condition the roller 83 is urged against the other side of the cam means.

Such a switching-off or changing-over device for the tape drive is operative in both directions of movement of the tape, even when the tape is only loosely fastened to the spools, since, as stated above, the standstill of the supply disc concerned releases the switching-off or changing-over device.

In the embodiment shown in FIGS. 10 to 12 the first component of the apparatus supporting the cam means 94 in the form of a cam is formed by the constantly driven disc 7 of the friction clutch 6, which frictionally drives the winding disc 101. The disc 101 forms the second component of the apparatus. The operating member 95 (similar to member 15 of FIGS. 1–3), actuating the switch 102 (similar to switch 21 of FIGS. 1–3), is formed by a beam 54, which is displaceable on a support 55. A bolt 57, fastened to the support, extends through an elongated slot 56 in the beam. A spring 97 tends to urge the beam with its extension 58 against the cam 94. The feeler is integral with the operating member and is formed by an extension 98 on the beam 54, which co-operates with a rubber coating 59 on the rim of the winding disc 3. The beam 54 is also subjected to the action of a spring 99, which tends to displace the beam in a direction opposite to the direction of rotation 100 of the winding device.

When the lug 94 has left the extension 58, the feeler 98 will be in contact with the rubber coating 59 under the action of the spring 97, so that owing to the friction contact between the two parts, during rotation of the winding disc, the beam 54 is displaced in the direction of the arrow 60 against the force of the spring 99 until one end of the elongated hole 56 is in contact with the bolt 57. In this position shown in FIGS. 10 and 11 the switch 102 is opened. When the lug 94 reaches the extension 58, the beam 54 is displaced so that the feeler 98 is lifted from the rubber coating 59 and the frictional contact between the two parts is interrupted. Immediately thereafter the spring 99 operates to displace the beam in a direction opposite to the direction of the arrow 60 until the other end of the elongated hole 56 is in contact with the bolt 57. In this position, shown in FIG. 12, the switch 102 is closed.

During rotation of the first and second components of the apparatus the operating member 95 is periodically reciprocated so that the switch 102 is alternately opened and closed. When the second component of the apparatus stands still or is arrested the beam is moved by the lug 94 into the position shown in FIG. 12. When the lug 94 leaves the extension 58, the feeler 98 comes into contact with the rubber coating 59; since the winding disc stands still, the beam is not displaced so that the switch 102 remains in the closed state. This means therefore, that the tape drive is switched off or changed over.

In the embodiment shown in FIGS. 13 to 15 reference numeral 111 designates a winding device of a recording and/or playback apparatus, which device comprises a winding mandril 112 and a winding disc 113, on which a tape coil, for example, on a spool can be arranged in the conventional manner. The winding disc 113 can be driven through a friction clutch (not shown). In this case the winding device 111 serves for taking up the tape, when the tape has to be moved in the normal forward travel and the arrangement is such that the winding device is driven not only during the "recording" operation but also during the "playback" operation of the apparatus and, as the case may be, also during fast forward movement of the tape. Therefore, the winding disc 113 forms the second component of the apparatus, which does not constantly rotate under all conditions. For example, if the winding disc holds a tape and if the tape is retained for some reason or other as described above with respect to the other embodiments, the disc will stand still in spite of the drive by means of the friction clutch. The winding disc will, however, rotate, as previously explained, during any travel of the tape.

The first constantly rotating part of the apparatus is the fly-wheel 104 which is usually connected with a capstan and which together with a pressure roller provides the drive of the tape. The fly-wheel may be driven by means of a belt driven by the motor of the apparatus.

The fly-wheel is provided with two cam means 114 and **114*a*. Operating members 115 and 115*a*, formed by lever 117 and 117*a* respectively, adapted to pivot about the shafts 116 and 116*a* respectively, are arranged for cooperation with cam means 114 and 114*a* respectively. Under the influence of springs 118 and 118*a*, rollers 119 and 119*a* respectively are urged to bear on a guide track of the cam means 114 and 114*a* respectively. The two cam means are constructed so that, when one of the levers is in the position most remote from the shaft of the fly-wheel, the other lever is at the minimum distance from the shaft of the fly-wheel, as is shown in FIG. 13. In other words, if one lever is in an extreme position determined by its corresponding cam means, the other lever is in the other extreme position. In this manner the two operating members 115 and 115*a* are controlled in opposite senses by the cam means 114 and 114*a*. Each of the levers 117 and 117*a* co-operates with a switch 121 and 121*a* respectively, which switches are electrically connected in parallel and perform in common the switching off or the reversal of the drive of the record carrier, as will be described further hereinafter. The switches are constructed so that they are closed when the levers are at the minimum distance from the shaft of the fly-wheel, and they are open, when the levers are in the other extreme position. The switches are arranged so that between the two extreme positions of the levers the two switches are closed in the central positions of the levers, as is shown in FIG. 14**, so that the two switches are actuated in overlap.

The free ends 124 and **124*a* respectively extending towards the winding device 111 of the levers 117 and 117*a* respectively are provided with a pivotally mounted feeler 125 and 125*a* respectively, constructed in the form of an arm. Each feeler is controlled by a spring 126 and 126*a* respectively, which tends to draw it against the stop 127 and 127*a* respectively provided on the lever. The free ends of the feelers are formed so that they co-operate with the second component of the apparatus i,e, the periphery 128 of the winding device 111**.

If under the action of the relevant cam means one of the operating members is in the extreme position, in which the lever is at the greatest distance from the shaft of the fly-wheel, the end 124 and **124*a* respectively of the switching member is pivoted over the largest distance from the periphery 128 of the winding device. In this position the relevant feeler 125 and 125*a* respectively is in contact with the stop 127 and 127*a* respectively, its free end extending radially towards the winding device, without however being in direct contact with the periphery 128 thereof. In this position the operating member holds the switch 121 and 121*a*** respectively in the open state.

When the fly-wheel is moved further, the feeler end of the operating member is displaced by means of the relevant cam means towards the periphery 128 of the winding device so that the free end of the feeler comes into contact therewith and the feeler is moved along by the resulting frictional force and against the spring acting upon it. During this displacement of the operating member the controlled switch is closed. The feeler then slides along the periphery 128 of the winding device. Finally the other extreme position is attained, after which the whole process is reversed. This applies in the same manner to each of the two operating members.

This means that with a constant rotation of the first and of the second component of the apparatus, i.e., the fly-wheel 104 and the winding disc 113, the two operating members 115 and 115*a* are constantly swung to and fro so that by means of these members the switches 121 and 121*a* are periodically opened and closed. Owing to the cam control of the operating members in opposite senses one switch is open while the other is closed. Overlap will occur so that the two switches are but closed at least one switch is always therefore closed. Since the two switches are electrically connected in parallel, the current circuit including the switches will then be constantly closed. If the switches are included, for example, in the current circuit of the driving motor, the motor is constantly ready for use and can provide the movement of the record carrier.

If, however, the winding device is held for some reason or other, for example, when the end of the record carrier is reached, or if the winding device stands still, the fly-wheel continues rotating for some time. During this rotation first one of the cam means 114 or 114*a* will reach the position in which the associated operating member is moved to an extent that its feeler extends radially towards the winding device. If the fly-wheel rotates slightly further, the free end of the feeler contacts, the periphery 128 of the winding device, being braked since the latter stands still and cannot carry along the feeler. The operating member is thus held in this position and can no longer follow the guide path of the cam means. The feeler thus operates as a holding member for the operating member. In this position, in which the operating member is held, the relevant switch is open and remains in the open state. Since the fly-wheel is still rotating because the drive via the other closed switch is maintained, the other cam means will displace the associated operating member in the same manner until it is also held in the extreme position by its feeler, as is shown in FIG. 15. The switch controlled by this operating member will then also be opened and will remain in the open state. This means that the two switches will both be open and the current circuit through them will be interrupted. If the switches are included in the current circuit of the driving motor, the motor and hence the drive of the record carrier will be switched off.

As stated above, the standstill of the winding device may be caused in various ways. In the case of a takeup device, as referred to above, tapes in magazines may be employed, where the end of the tape is fixed to a spool core. In this case the spool stands still when the end of the tape is reached and hence the winding device will also stand still. In magazined tapes, in which the tape is arranged in the magazine without being protected by spool flanges, it is particularly important to use the take up device as a second component of the apparatus. If the tape during winding is jammed in the magazine, the tape will stand still, but the tape drive will continue to feed tape, so that loops are formed, which may result in damage to the tape. With the arrangement described above this is avoided, since owing to the standstill of the winding-up device the switching-device becomes operative. If tapes are used, which are only loosely connected with the spools, it is desirable to use the supply disc as the second component of the apparatus, since it will not rotate at the end of the tape or in the event of rupture of the tape. In practice both the supply disc and the take-up disc may be provided with such a device so that the device is operative in both directions of movement of the tape.

In the embodiment shown in FIgS. 16 to 18 the two operating members 115 and 115*a* are controlled by a single cam means 114, also fastened to the fly-wheel 104′. In order to obtain the relatively opposite displacements of the operating members the levers 117 and 117*a* thereof co-operate with diametrically opposite peripheral parts of the cam means. The two operating members 115 and 115*a* are associated with a switch 121 actuated in common. The actuation of the switch 121′ is performed by means of a rod system 61, which co-operates with the free ends 124′ and 124′*a* of the two levers of the operating members.

The operation of the device is similar to that of the embodiment described above. FIG. 16 illustrates the position in which each of the operating members 115 and 115*a* is in an extreme position under the action of the cam means 14, with both the first component 104′ and the second component 113′ of the apparatus rotating. The operating member 115′ has thus released the switch 121′ and the operating member 115*a* holds it in the closed state. FIG. 17 shows the central position of the operating members at the transition to the opposite extreme positions, in which the two operating members hold the switch in the closed state. When the two components 113′ and 104′ of the apparatus continue rotating a position similar to that shown in FIG. 16 is obtained, in which the operating member 115′ holds the switch 121′ in the closed state, whereas the operating member 115*a* has released the switch. Under these conditions i.e., the overlapping actuation of the switch by the operating members, the switch 121′ is therefore constantly closed.

If for some reason or other the spool disc 113′ stands still, the two operating members are moved by the cam means 104′ in order of succession into that extreme position in which both of them release the switch 121′ both being held in these positions by the feelers braked at the stationary spool disc, as is illustrated in FIG. 18. In this way the switch 121 is opened and remains in this state.

In the preceding embodiment the switch 121′ serves directly for switching the operational voltage of the apparatus, since it is included in the current circuit of the driving motor 46′ and of the further electrical parts 62 of the apparatus, for example, amplifiers and the like. Therefore, if the winding device 111′ stands still, while the apparatus is switched on, the apparatus in total is switched off as is shown in FIG. 18. In order to cause the apparatus to operate again after such an interruption, a separate switch 63 is provided by which the switch 121′ can be shunted for a short time until the feelers have released the operating members by the then rotating winding device 111′. The actuation of the switch 63 may be performed in various ways, for example, by hand or simultaneously with the displacement of a control-member of the apparatus for switching on a given mode of travel of the record carrier.

In the foregoing a device for switching off the drive of the record carrier is described. If, for example, the end of the record carrier is reached after travel in one direction of movement and a reversal of the direction of movement is desired, the drive of the record carrier should is changed over, for example, by means of a bistable multivibrator, as soon as the switch 121′ is opened.

What is claimed is:

1. In a recording and/or playback apparatus having means for switching off or reversing direction of the record carrier drive, a control mechanism for initiating the switching off or reversing operation comprising a first component rotatably mounted on the apparatus for constant rotation when in operation, a second component mounted for rotation only during travel of the record carrier, cam means attached to said first component, an operating member movably mounted on said apparatus for cooperation with said cam means being arranged for displacement by said cam means, a switch being actuated by said operating member when said operating member is displaced by said cam means, said cam means continuously cycling so as to cause periodic displacement of said operating member for cyclically actuating and deactuating said switch, at least one feeler means pivotally connected to said operating member and arranged for cooperation with said second component being in frictional contact therewith so that as said second component rotates said feeler means will be urged to pivot into the direction of rotation, a spring means connected to said feeler for urging said feeler means in a direction opposite to the direction of rotation of said second component, said feeler means engaging said second component so as to maintain said operating member in a displaced condition when said second component is prevented from rotating so that said switch means will be held in one of its switching modes and prevented from cycling, and means actuated by said switch for initiating switching off of the apparatus for reversal of the drive when said switch is held in said switching mode.

2. The mechanism according to claim 1 wherein said first component comprises a fly-wheel mounted on said apparatus, said cam means being mounted on said fly-wheel.

3. The mechanism according to claim 1 further comprising a winding device for taking-up said record carrier, and a clutch operated by a driving member for frictionally driving said winding device, said winding device being rotatably mounted on said apparatus and comprising a mandril and a driven member for receiving a record carrier spool.

4. The mechanism according to claim 3 wherein said first component is said driving member, said cam means being mounted on said driving member.

5. The mechanism according to claim 4 wherein said second component is said driven member of said winding device.

6. The mechanism according to claim 5 further comprising a stop element mounted on said operating member for limiting the pivotal movement of said feeler means in the direction urged by said spring, said feeler means comprising an arm attached to an end of said operating member, said arm having a free end for engagement with said second component, and arranged for pivotal movement about the point of attachment to said operating member in a direction away from said stop element when in contact with said second component and when said second component is rotating, whereby said arm will engage said stop under the influence of said spring when said second component is not rotating and when said operating member has been displaced to an extreme position to thereby prevent further movement of said operating member.

7. The mechanism according to claim 6 further comprising means to cause said free end of said arm to be disengaged from contact with said second component by pivotal movement of said arm away therefrom when said second component reverses direction.

8. The mechanism according to claim 6 further comprising additional feeler means pivotally attached with said operating member so that at least a pair of feeler means are attached to said operating member, said pair of feelers each comprising an arm having a free end for engagement with said second component, said arms being mounted for movement in directions substantially opposite each other, one of said feeler means being arranged for cooperation with said second component when said second component is operative in one direction, the other feeler means of said pair of feeler means arranged for cooperation with said second component when said second component is operative in the reverse direction.

9. The mechanism according to claim 8 further comprising a change over mechanism having means for engagement with said pair of feeler means so that one of said feeler means is allowed to cooperate with said second component and the other feeler means is maintained out of engagement therewith when said second component is operative in one direction, and means for changing the position of said engagement means so that the other of said feeler means is allowed to cooperate with said second component and said first mentioned feeler means is held out of engagement therewith when said second component is operative in the reverse direction.

10. The mechanism according to claim 6 further comprising a pair of winding devices for receiving and supplying said tape carrier, one of said winding devices operative as the receiving means when the record carrier is travelling in one direction, the other winding device operative as the receiving means when the record carrier is operative in the other direction, additional feeler means attached with said operating member for pivotal movement so that at least a pair of feeler means are attached with said operating member, each of said feeler means being associated for cooperation with one of said winding devices, and means connected with the operating member so that only one of said feeler means is arranged for cooperative engagement with its associated winding device when the tape carrier is travelling in one direction and so that only the other feeler means is arranged for cooperative engagement with its associated winding device when the tape carrier is travelling in the other direction.

11. The mechanism according to claim 1 further comprising an additional operating member movably mounted on said apparatus so that said apparatus is provided with a pair of operating members, each of said pair of operating members having one end thereof arranged for cooperation with said cam means so that each of said operating members is displaceable in a direction opposite the other, feeler means attached to the other end of each of said operating members for cooperation with said second component, said switch means being held in one switching mode by overlapping contact with said pair of operating members while said second component is rotating each of said operating members being held in an extreme displaced position by said feeler means in contact with said second component when said second component is standing still so that said switch means will be held in the other switching mode to thereby initiate the switching-off or reversing operation of the apparatus.

12. The mechanism according to claim 11 wherein said cam means comprises a first cam element for cooperation with one of said pair of operating members and a second cam element for cooperation with the other operating member of said pair of members.

13. The mechanism according to claim 11 wherein said switch is wired in line with the supply of voltage to said apparatus thereby directly controlling all power to the apparatus.

* * * * *